May 21, 1940.                M. A. DALOTEL                2,201,886
                         MOTION PICTURE CAMERA
                         Filed April 22, 1938              2 Sheets-Sheet 1
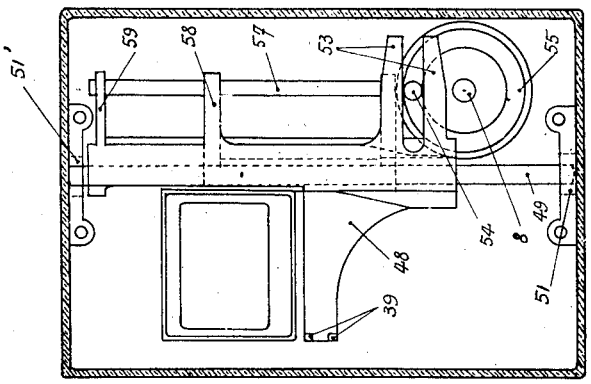
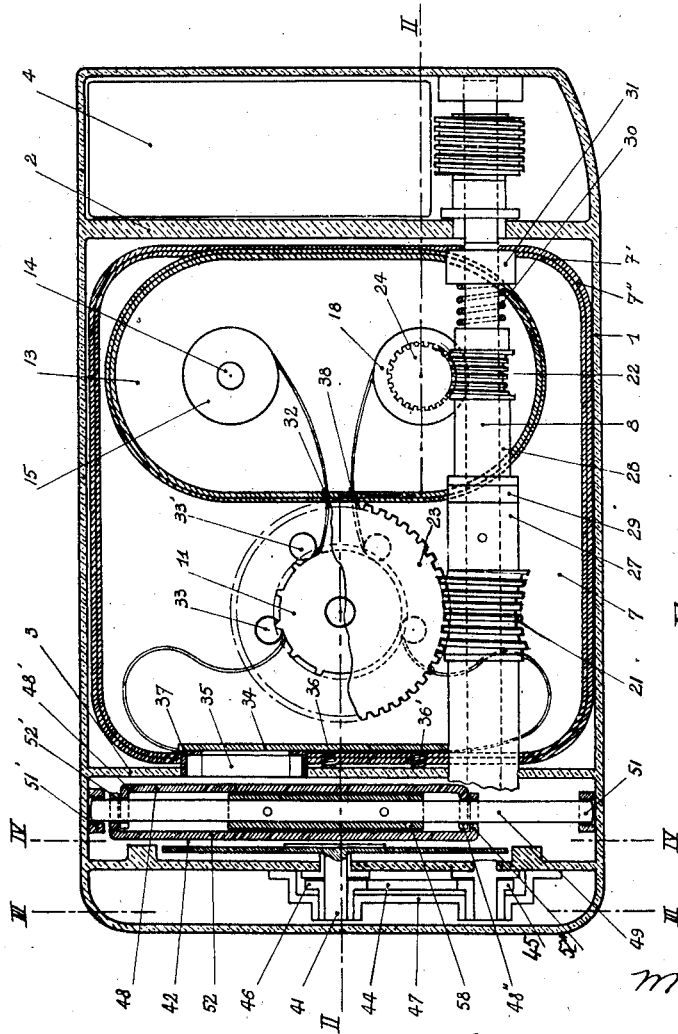

May 21, 1940.  M. A. DALOTEL  2,201,886
MOTION PICTURE CAMERA
Filed April 22, 1938  2 Sheets-Sheet 2
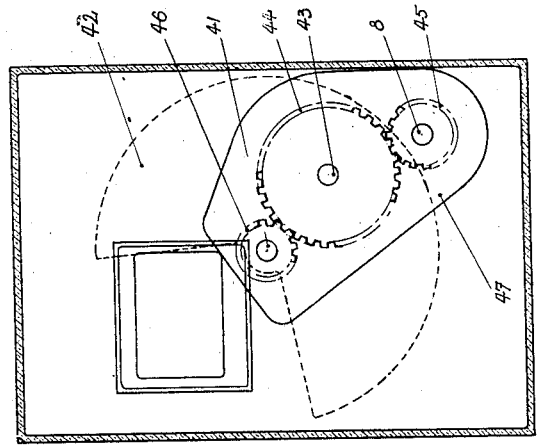
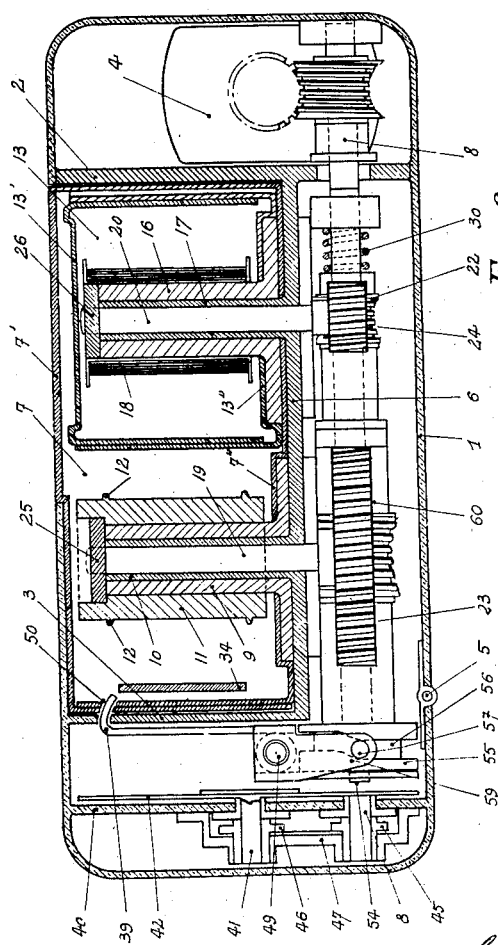
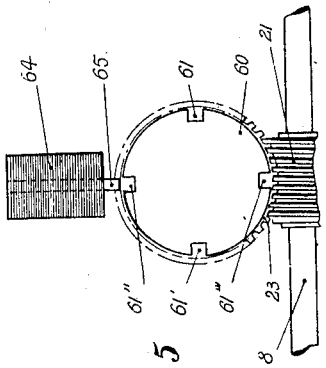

Patented May 21, 1940

2,201,886

UNITED STATES PATENT OFFICE 2,201,886

MOTION PICTURE CAMERA

Maurice Albert Dalotel, Deuil, France

Application April 22, 1938, Serial No. 203,667
In France April 22, 1937

1 Claim. (Cl. 88—17)

The present invention relates to a motion picture camera which is particularly applicable to the devices called cinematograph machine guns and which are intended for checking firing exercises in which movable objectives are used, in particular aeroplanes. The invention has in particular for its object to provide a camera of small bulk which is simple to manipulate and in particular requires only a small number of operations for placing in position and removing the film. It has already been proposed for this purpose to use cameras provided with a loader containing the unexposed film spool and a spool for winding the exposed film, the connection of the actuating members of the camera which cause the film to unwind and wind with the corresponding members of the loader being effected automatically when the latter is placed in position. However, in such cameras, it is necessary when the loader has been placed in position, to place the film in contact with the actuating members, in particular with a toothed drum, which are secured to the apparatus itself.

The apparatus which is the object of the invention belongs to this latter type of loader, and it is characterized by the fact that the loader comprises on the one hand a magazine box containing the two spools for the unexposed film and the exposed film and provided with two slots for the outlet and the inlet of the film, and on the other hand a toothed output drum controlling the unwinding of the film, said output drum together with the spool of the magazine box on which the exposed film winds being supported by fixed bushes secured to the loader and fitting loosely over likewise fixed bushes which are secured to the camera and inside which are lodged the rotating transverse drive shafts with which the output drum and the winding spool are made to rotate integrally at the instant when the loader is introduced into the camera.

Owing to this arrangement of the output drum in the loader, the operator will only have to introduce it into the camera without having to touch the film, a fact which forms a very considerable simplification of the movement of the camera.

By way of example an embodiment of the camera which is the object of the invention has been described hereinafter and illustrated in the accompanying drawings.

Fig. 1 is a view in sectional elevation, partly broken away, of the camera provided with its loader.

Fig. 2 is a horizontal section along the chain dotted line II—II of Fig. 1.

Figs. 3 and 4 are transverse sections thereof respectively along the lines III—III and IV—IV of Fig. 1.

Fig. 5 shows an elevation of a constructional detail of the camera.

The camera shown in the drawings comprises a box 1 separated into three compartments (Fig. 1) by two transverse partitions 2 and 3, the rear compartment containing a motor 4 which is either electric or clockwork, whereas the front compartment which is mounted on the body of the box 1 by means of a hinge 5, contains the objective and the members which are described in detail hereinafter and which control the shutter and the feed of the film. The central compartment is furthermore divided by a longitudinal partition 6 into two chambers one of which is adapted to receive the loader 7 and the other of which contains the main transmission shaft 8 which is driven by the motor 4.

The loader 7 is formed by two boxes 7', 7" which have opposite ends and fit into each other, the inner box 7" being provided at the front with a bushing 9 which fits on to a transverse bushing 10 secured to the longitudinal partition 6 of the case 1, an output drum 11 provided with teeth 12 corresponding to the perforations of the film being loosely mounted on said bushing 9 which is fixed to the box 7" of the loader. In the rear part of the loader 7 is arranged a magazine box 13 formed like the loader by two parts 13', 13" fitting into each other, the inner part 13" carrying on its end on the one hand a spindle 14 (Fig. 1) on which is loosely mounted the unexposed film spool 15, and on the other hand a bushing 16 (Fig. 2) fitting over a bushing 17 secured to the partition 6 of the case 1 and penetrating into the loader through an opening provided in the end of the part 7" of said loader. On the bushing 16 of the magazine box is loosely mounted a spool 18 on which the exposed film winds.

The output drum 11 and the winding spool 18 for the film are rotated by transverse drive shafts 19, 20 which rotate respectively inside the bushes 10 and 17 which are fixed on the longitudinal partition 6 and are themselves driven by the main longitudinal drive shaft 8 through the intermediary of worms 21, 22 and pinions 23, 24. The coupling of the output drum 11 and of the winding spool 18 with the shafts 19 and 20 which drive them is effected by means of transverse grooves provided at the upper end of said shafts in the manner of screw heads and in which are adapted to engage bars 25, 26 fixed across the bores of the drum 11 and of the spool 18. The worm 21 meshing with the pinion 23 which is fast on the drive shaft 19 of the output drum 11 is secured to a bush 27 which is fast on the transmission shaft 8, whereas the bush 28 carrying the worm 22 which drives the actuating shaft 20 of the winding spool, is loosely mounted on the shaft 8 to which it is secured by means of a friction device formed by a leather or fibre disc 29 against which the bush 28 is held by a spring 30 which bears on an adjustable abutment 31, the slipping of said friction device enabling an automatic variation of the speed of rotation of the winding spool 18 to be obtained proportionally to the tension of the film which depends on the amount of film wound on said spool.

The unexposed film of the spool 15 issues from the magazine box 13 through a calibrated slit 32, engages on the output drum 11 on which it is held by presser rollers 33, 33', then engages, after having formed a loop, in the guide passage formed by a plate 34 arranged in front of a window 35 provided in the double wall 7', 7" of the loader and in the partition 3. The guide plate 34 for the film is resiliently fixed on the partition 3 by means of springs 36, 36', and the rear part of the lens mounting 37 which is arranged in the front compartment of the camera pivoting on the hinge 5, penetrates on closing into the window 35 and presses on the guide plate 34, which causes the centre of the objective to be located always at the same distance from the film whatever play there may be in the closure. As it issues from the guide passage 34, the film forms a fresh loop, engages on the output drum 11 then re-enters the magazine box 13 through a second slit 38 and is finally wound on the spool 18.

The discontinuous feed of the film in the guide passage is controlled by a claw 39 (Figs. 2 and 4), the method of driving which will be described in detail hereinafter, and which penetrates into the loader through a small opening 50. The hinged front compartment of the case 1 of the camera has a transverse partition 40 serving for supporting the shaft 41 of a shutter 42 (Figs. 2 and 3) which is arranged behind said partition, and also an intermediate shaft 43 carrying a pinion 44 meshing on the one hand with a pinion 45 fast on the end of the main transmission shaft 8, and on the other hand with a pinion 46 fast on the shaft 41 of the shutter, the whole of this group of pinions being enclosed in a case 47.

Between the partitions 3 and 40 of the front compartment of the camera, is arranged the actuating mechanism for the film feed claw 39 which comprises the following members: the claw 39 is supported by a part 48 (Figs. 1 and 4) the bent over ends 48', 48" of which are hinged on a vertical shaft 49 which is pivoted at its ends in bearings 51, 51'. A part 52 formed by a plate that is bent over at its ends 52', 52" which fit over the ends 48', 48" of the support 48 of the claw 39, is so mounted that it can move vertically along the shaft 49. For this purpose, the part 52 is provided at its lower end with a fork 53 (Fig. 4) in which is engaged a finger 54 of a cam-plate 55 fast on the transmission shaft 8, this device thus enabling the reciprocating movement of the claw 39 to be obtained. In order to obtain the engagement of said claw with the perforations of the film when said claw is in its high position and the disengagement of same when it is in its low position, the cam-plate is provided on its side with a sinusoidal groove 56 (Fig. 2) in which engages the end of a vertical rod 57 which is secured to a part 58 pinned on the shaft 49, said vertical rod being in engagement with a fork 59 of the support 48 of the claw 39. When the shaft 8 and the cam 55 rotate, the vertical rod 57 undergoes an alternating translatory movement and consequently imparts to the support 48 of the claw an oscillatory movement about the vertical shaft 49, so that it suffices to set the actuating finger 34 suitably relatively to the sinusoidal groove 56 on the plate 55 in order to obtain the engagement and the disengagement of the claw 39 at the required instants.

The camera according to the invention is furthermore provided with a device which enables the camera to be stopped always in a position in which the shutter is open, so as to separate the successive sets of pictures corresponding to different rouns of firing by a black picture on the film. Said stopping device comprises a plate 60 which is provided with a plurality of notches 61, 61' . . ., etc., and is driven by the transmission shaft 8 through the intermediary of the worm 21 and the pinion 23 which is secured to said plate. An electromagnet 64 is arranged above the plate 60 in such a manner that its plunger 65 can engage in one of the notches 61 when the electromagnet is de-energized. The plate 60 is so set on the pinion 23 that at the instant when the shutter opens, one of the notches 61 comes opposite the plunger 65 of the electromagnet 64. The energization circuit of the electromagnet 64 is controlled by the same switch as the driving motor 4 of the camera, so that the interruption of the current supplying the motor causes the plunger 65 to fall and consequently the camera to be locked with the shutter open.

The plate 60 or the plunger 65 are mounted resiliently on their supports so as to prevent a violent shock when stopping.

Of course, the camera which has just been described may be completed, without exceeding the scope of the invention, by improvements of detail that are known in motion picture cameras or more particularly in photo-machine guns. In particular a picture counter may be added and a chronometer which is photographed in known manner on each of the pictures of the film.

What I claim is:

A motion picture camera, particularly applicable for cinematograph machine guns comprising a hinged front compartment provided with an object lens mounting protruding rearwardly from said compartment, and a central compartment adapted to receive a magazine box which is pushed laterally into said central compartment and provided in its front wall with a window opposite said object lens and with a spring pressed plate mounted inside the magazine box in front of said window and forming the guide passage for the film, the rear end of the object lens mounting extending, when the hinged front compartment of the camera is closed, through the window of the magazine box so as to press against said guide plate, whereby the distance between the centre of the object lens and the film is kept constant, said magazine box further containing on one hand a tightly closed casing for the two spools of unexposed film and exposed film, and, on the other hand, a toothed driving drum for unwinding the unexposed film and located outside the casing, two bushings transversely located in the loader to which they are rigidly secured and supporting the driving drum and the spool of exposed film, two bushings secured to the camera and on which the first named bushings are loosely fitted, rotating shafts lodged within said bushings secured to the camera and means whereby said drum and spool are automatically coupled with said rotating shafts.

MAURICE ALBERT DALOTEL.